Oct. 13, 1931.                 T. J. McCORMICK                 1,827,095
                                  TIRE COVER
                          Filed July 14, 1930        5 Sheets-Sheet 1

INVENTOR
Thomas J. McCormick
BY Francis D. Hardesty
ATTORNEY

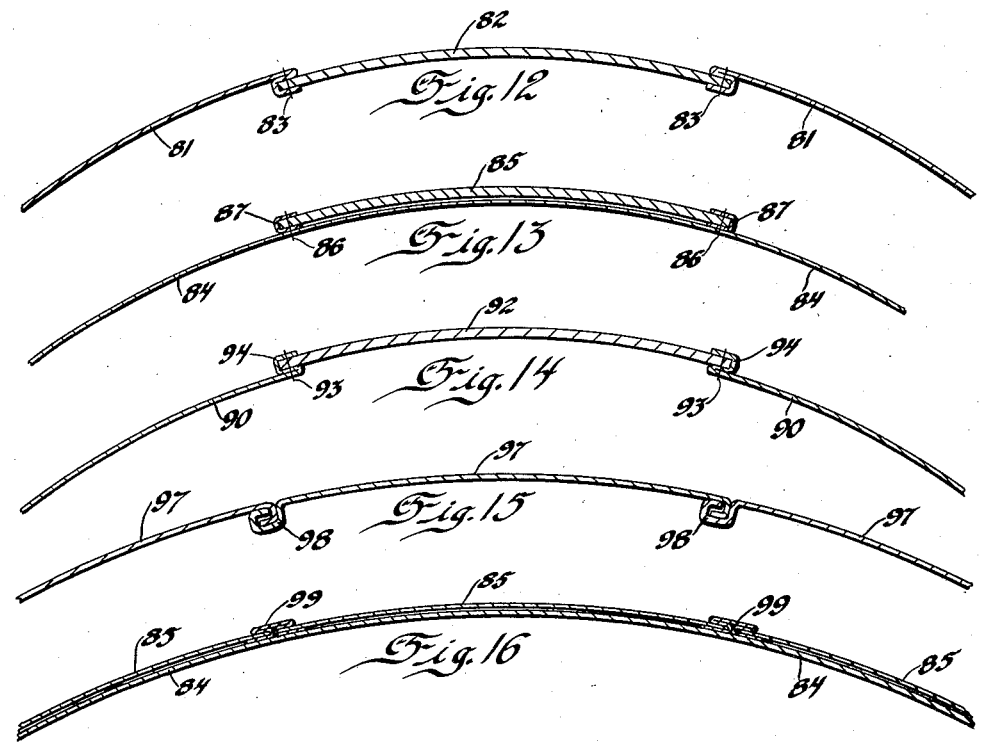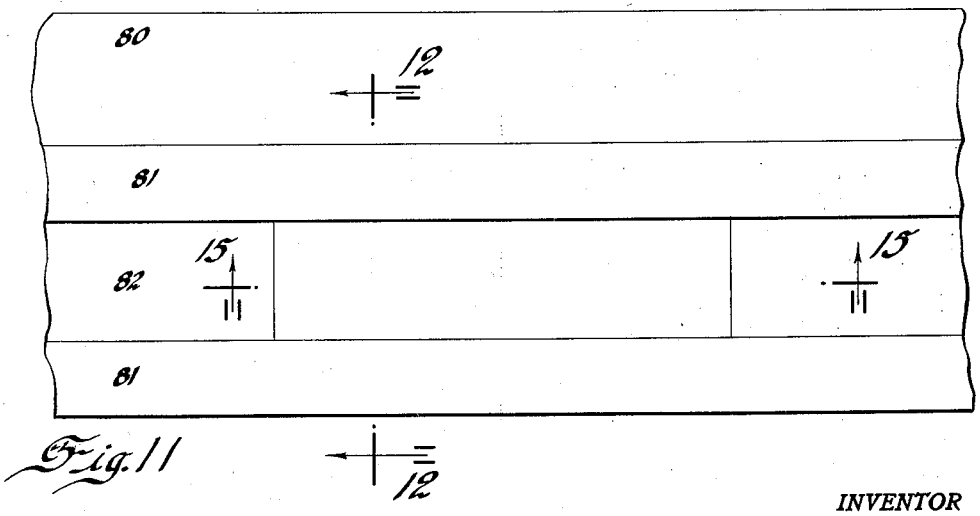

Oct. 13, 1931.  T. J. McCORMICK  1,827,095
TIRE COVER
Filed July 14, 1930  5 Sheets-Sheet 3
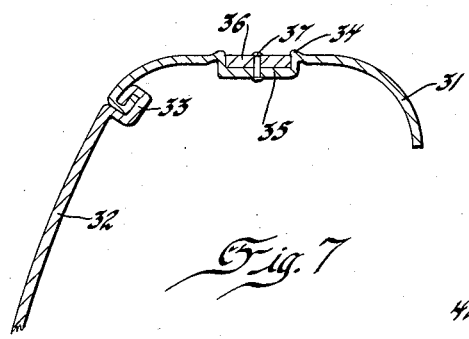
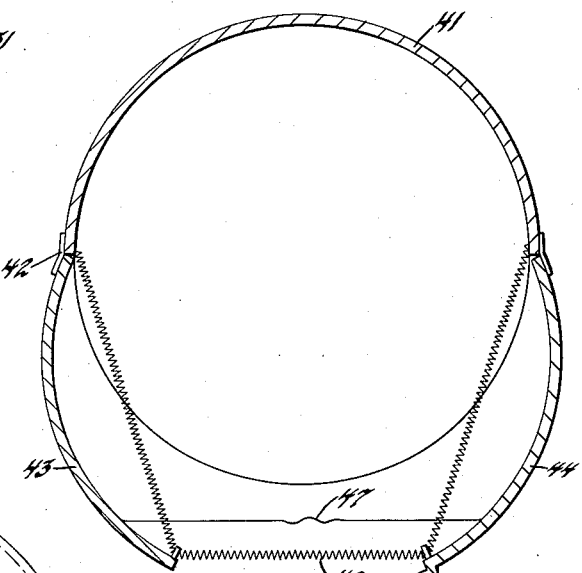
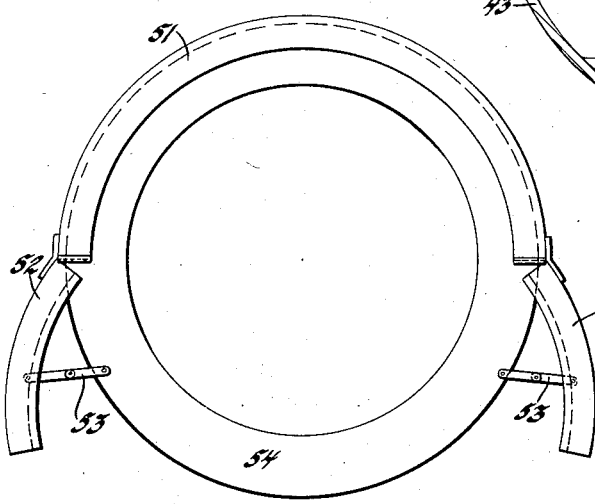
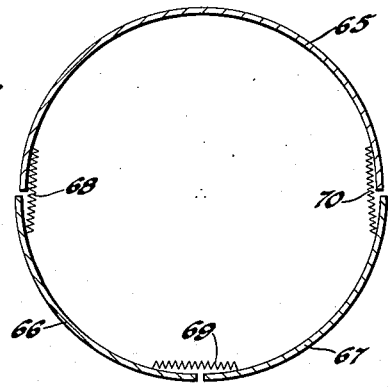
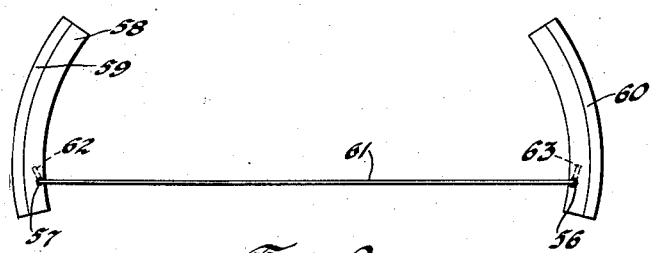
INVENTOR
Thomas J. McCormick
BY Francis D. Hardesty
ATTORNEY Oct. 13, 1931. T. J. McCORMICK 1,827,095
TIRE COVER
Filed July 14, 1930 5 Sheets-Sheet 5

INVENTOR.
Thomas J. McCormick
BY
Francis D. Hardesty.
ATTORNEY.

Patented Oct. 13, 1931

1,827,095

UNITED STATES PATENT OFFICE

THOMAS J. McCORMICK, OF DETROIT, MICHIGAN

TIRE COVER

Application filed July 14, 1930. Serial No. 467,988.

This invention relates to tire covers.

The tendency, of late, in the manufacture of automobile tire covers has been towards metal covers or covers having metallic portions thereon, the covers or their metal portions being of a metal which will take a high polish, or being plated with some silvery metal such as chromium, or being colored or painted.

An object of this invention, therefore, is a cover having metallic portions which may be plated, painted or polished to present a highly ornamental and attractive finish.

A further object is a cover which is readily applicable to the tire, even though it be made entirely of metal.

A still further object is a novel form of cover including a face covering element and a tread covering element partially secured to the face cover element and having separable wings thereon which permit application of the cover to the tire.

A still further object is a cover having formations at desired points thereon which will permit flexing of the cover at such points.

A still further object is a cover including narrow metallic strips secured to the tread portion thereof, the strips being of a polished metal.

Still further objects will readily occur to those skilled in the art upon reference to the following description and the accompanying drawings in which Fig. 1 is a perspective view of the cover;

Fig. 7 is a fragmentary cross section of a modified form of cover, as if on the line 7—7 of Fig. 2;

Figs. 8, 8a, 9 and 10 show modifications of the same;

Fig. 11 is a fragmentary view of a modification as if in the direction of the arrow 2 of Fig. 1;

Fig. 12 is a section on the line 12—12 of Fig. 11;

Figs. 13 and 14 are similar sections of modifications;

Fig. 15 is a section on the line 15—15 of Fig. 11; and

Fig. 16 is a similar section of a modification;

Figure 1:
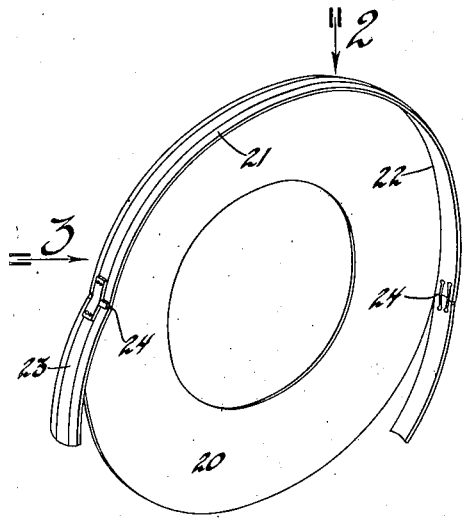
Figure 2:
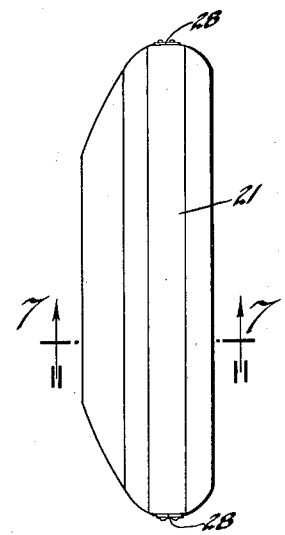
Fig. 2 is a view thereof in the direction of the arrow 2 of Fig. 1.

Referring to the drawings and more particularly to the form shown in Figs. 1 to 6 inclusive, there is shown a cover having a face cover element 20 and a semi-annular tread cover element 21 secured thereto along the semi-circular line 22 so as to be substantially integral therewith. Secured to the element 21 are one or more arcuate members 23, the securing means comprising a spring hinge of any one of various forms and adapted to permit movement of an element 23 with respect to element 21 upon a line 24, the elements 23 serving to conceal or cover that portion of the tread left bare by the semi-circular element 21.

Figure 4:
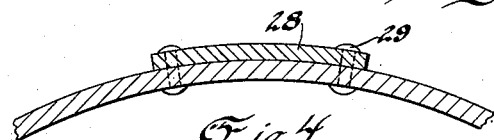
Fig. 4 is a section on the lines 4—4 of Figs. 3 and 5.
Figure 3:
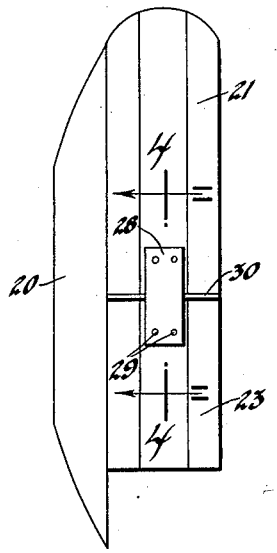
Fig. 3 is a view thereof in the direction of the arrow 3 of Fig. 1.
Figure 5:
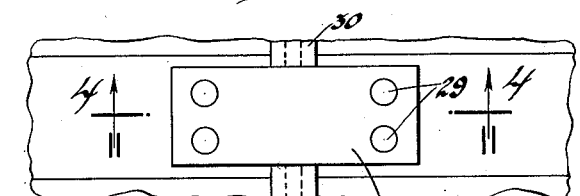
Fig. 5 is an enlarged detail of a portion of the cover.
Figure 6:
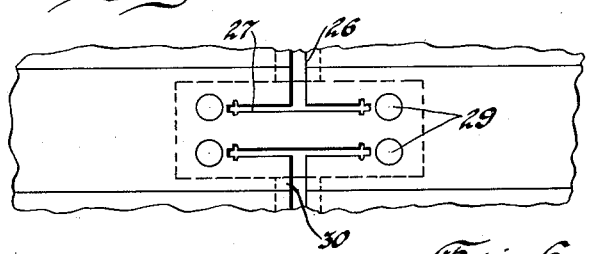
Fig. 6 is a view similar to that of Fig. 5, but taken from within the cover.
Figure 17:
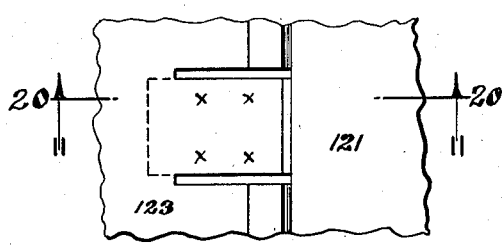
Figs. 17 to 25 show a modification.
Figure 18:
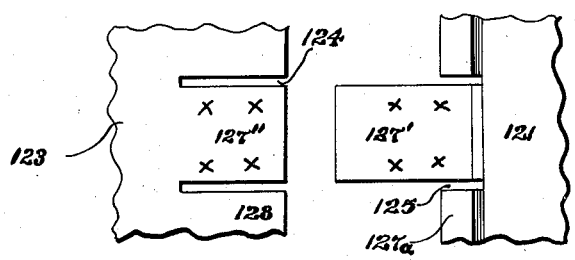
Figure 19:
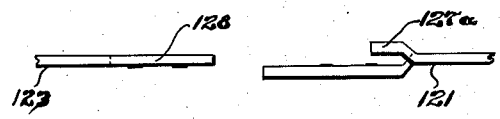
Figure 20:
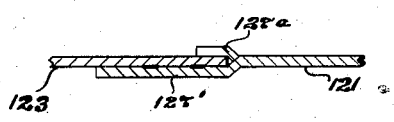
Figure 21:
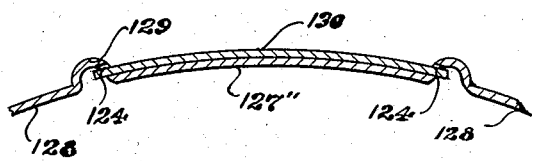
Figure 22:
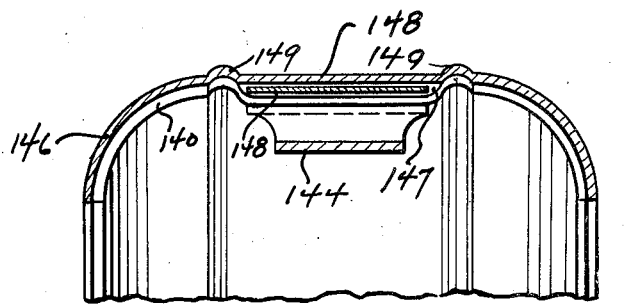
Figures 23, 24:
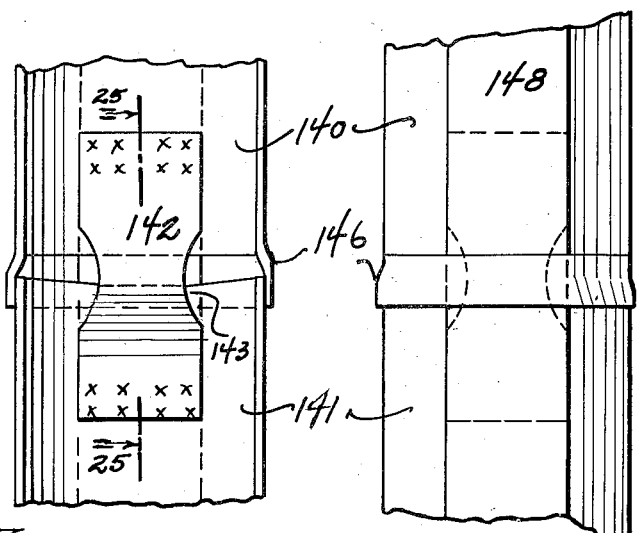
Figure 25:
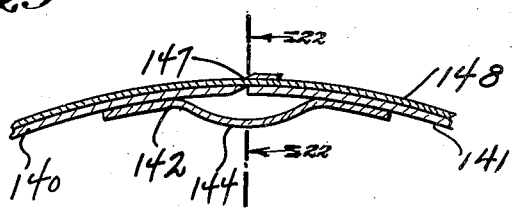

One of the preferred hinges for hingedly securing the elements 21 and 22 to each other is shown best in Figs. 4 to 6. In this form the elements 21 and 23 are integral with one another, they being partially separated by the oppositely disposed T shaped slots (Fig. 6) each of which comprises a leg bar 26 and a top bar 27, there being a contracting spring metal band 28 secured to the elements 21—23 by means of the rivets 29, which are preferably located in the "continuous" portion of the tread strip as distinguished from the short ends produced by the slots, the gaps left by the slots 26 being partially concealed by the moldings indicated at 30.

Fig. 7 discloses a modification wherein the tread strip 31 is secured to the face piece 32 by a bead and hook formation illustrated at 33, it being the purpose of this construction to enable separation of elements 31 and 32 if desired.

Further the tread strip 31 is provided with a pair of spaced beads 34 between which is a depression 35 containing a metallic strip 36 secured to the tread strip 31 by means of the rivets 37.

Fig. 8 discloses a tread strip comprising a semi-circular member 41 having hingedly connected thereto at the line 42 the separable elements 43 and 44 adapted, when brought together, to form a complete circle with a portion 45 of the element 44 overlapping element 43. In this modification a coil spring 46 is used to draw elements 43 and 44 to each other after they have been sprung apart and a wire or similar element 47 is used to prevent excessive separation of the elements 43 and 44, with a consequently excessive tensioning of the coil spring 46.

In the form of Fig. 8a the tread strip 51 is provided with a pair of separable elements 52 there being a hinge leaf 53 or similar device between an element 52 and the cover strip to maintain each element 52 in spaced relation with respect to the tire and the face cover 54, the elements 53 being collapsible, to permit movement of elements 52 toward the tire and the face cover.

In the modification of Fig. 9 two holes 56 and 57 are provided in the beaded edge 58 of the tread strip elements 59 and 60 and a spacer bar 61, of suitable length, and having down-turned portions 62 and 63 is disposed within the holes 56 and 57 to maintain elements 59 and 60 in spaced relation when the tire is being inserted in the tire cover, the spacer bar 61 being removable to permit elements 59 and 60 to come together and conceal the cover.

In the modification of Fig. 10 the tread strip 65 is provided with a plurality of terminals 66 and 67, there being a plurality of coil springs 68, 69, and 70, to hold elements 65, 66, and 67 to one another and in cover concealing position.

In the modification of Fig. 11 the face piece 80 and the tread piece 81 are preferably of fabric, while the strip 82, narrower than the tread piece and secured thereto in some suitable fashion, is preferably of a highly polished metal. The strip 81 may be sewed directly to the tread pieces 82 along the lines 83 substantially as shown in Fig. 12.

In the modification of Fig. 13, the tread piece, indicated at 84, is in one piece and the supplementary polished metal band 85 is sewed thereto in some suitable fashion along the lines 86 as indicated, there being fabric channels 87 to assist in preserving and enhancing the beauty of the device.

In the modification of Fig. 14 tread strip is of two parts 90 and the polished metal band 92 is secured thereto and secures them to each other along the lines 93, the edges of the strips 90 being bent back, substantially as shown at 94.

While it is possible to have the metal strips 82, 85, and 92 (Figs. 12 to 14) of one continuous strip, it may be desired to make the same of a plurality of sections which, when combined in an appropriate fashion, form an annular ring secured as previously described, to the tread strips. For example, in the modification of Fig. 15, the metal strips indicated at 97 are secured to each other by the well known form of interlock such as that shown at 98.

In the modification of Fig. 16, which is preferably made along the lines disclosed by Fig. 13, the tread strip 84 has secured thereto at intervals a reversely bent molding member 99 between pairs of which are inserted the sections 85 of the metallic strip material, portions 85 and 99 being preferably of contrasting colors and appearance.

In Figs. 17–21 there is shown a hinge joint between the sections of cover, the joint being in some respects, the equivalent of the joint shown in Figs. 1–6, the sections 121 and 123 being completely separated, and being slotted at 124 and 125, as shown. Tongue 127' of section 121 is spot welded or riveted to tongue 127'' of section 123 at the points X, and is bent out of the plane of the sections to provide a smooth joint on the top surface of the cover. Section 121 is also provided with bent up portions 127a which fit over the level portions 128 of section 123 to conceal the gap between the sections.

If desired, the sections may be provided with longitudinal beads 129 in the side walls of which the slots 124 and 125 may be formed, these slots serving also to retain and grasp a finishing strip 130, which may be polished, plated or painted to appear like or contrast with the remainder of the cover.

In the modification of Figs. 22 to 25 inclusive, the hinge joint between cover sections 140 and 141 includes a spring element 142 welded to the under surface of the sections 140 and 141 and weakened and bent up, as shown at 143 and 144, respectively. Further, the section 140 is provided with a raised lip 146 lapping the end of section 140, there being a slot at 147 between the lip and the remainder of the section 140, thru which a metal band 148 may be passed, the band being on the outside of the cover, as in Fig. 25, except where the lip 141 passes over it.

If desired, the band 148 may be dispensed with, in which case no slot 147 is provided. Further, band 148 may be different in color, polish, or appearance from the cover sections 140 and 141, if desired. Further, beads at 149 may be formed in the sections 140 and 141 if desired, to enhance the appearance of the cover.

Now having described the invention and the preferred embodiments thereof, it is to be understood that the said invention is to be limited, not to the specific details herein set forth, but only by the scope of the claims which follow:

I claim:

1. In a tire cover, a continuous annular face element and a tread element, the latter including a substantially semi-circular channelled portion integrally secured to said face element and to arcuate channelled members hingedly connected thereto and adapted to come together to form a second substantially semi-circular portion.

2. In a tire cover, a continuous annular face element and a tread element, the latter including a substantially semi-circular channelled portion secured to said face element so as to be substantially integral therewith and two arcuate channelled members hingedly connected to said semi-circular portion and independent of said face element, and adapted to come together to form a second substantially semi-circular portion.

3. In a tire cover, a continuous annular face element and a tread element, the latter including a substantially semi-circular channelled portion integrally secured to said face element and two arcuate channelled members resiliently and hingedly connected thereto and adapted to come together to form a second substantially semi-circular portion.

4. In an annular tire cover of relatively resilient sheet metal, a narrow annular split tread strip having a pair of oppositely disposed T shaped slots at aligned points in the edges thereof to permit flexing of the split tread strip.

5. In an annular tire cover of relatively resilient sheet metal, a narrow annular split tread strip having a pair of oppositely disposed T-shaped slots at aligned points in the edges thereof to permit flexing of the split tread strip, the top bars of the T's being adjacent and parallel.

6. In an annular tire cover of relatively resilient sheet metal, a narrow annular split tread strip having a pair of oppositely disposed T-shaped slots at aligned points in the edges thereof to permit flexing of the split tread strip, the leg bars of the T's being in alignment.

7. In an annular tire cover of relatively resilient sheet metal, a narrow annular split strip having a pair of oppositely disposed T-shaped slots at aligned points in the edges thereof to permit flexing of the split tread strip, the leg bars of the T's extending to said edges.

8. In an annular tire cover of relatively resilient sheet metal, a narrow annular split tread strip having a pair of oppositely disposed T-shaped slots at aligned points in the edges thereof to permit flexing of the split tread strip, the top bars of the T's being adjacent and parallel, and the leg bars of the T's being in alignment.

9. In an annular tire cover of relatively resilient sheet metal, a narrow annular split tread strip having a pair of oppositely disposed T-shaped slots at aligned points in the edges thereof to permit flexing of the split tread strip, the top bars of the T's being adjacent and parallel, and the leg bars of the T's extending to said edges.

10. In an annular tire cover of relatively resilient sheet metal, a narrow annular split tread strip having a pair of oppositely disposed T shaped slots at aligned points in the edges thereof to permit flexing of the split tread strip, the top bars of the T's being adjacent and parallel, and the leg bars of the T's being in alignment and extending to said edges.

11. In an annular tire cover of relatively resilient sheet metal, a narrow annular split tread strip having a pair of oppositely disposed T shaped slots at aligned points in the edges thereof to permit flexing of the split tread strip, and a strip contracting spring member secured to said strip.

12. In an annular tire cover of relatively resilient sheet metal, a narrow annular split tread strip having a pair of oppositely disposed T shaped slots at aligned points in the edges thereof to permit flexing of the split tread strip, and a strip contracting spring member secured to said strip, the top bars of the T's being adjacent and parallel, and the securing means for said member being located near said top bars in the continuous portion of the tread strip.

13. In an annular tire cover of relatively resilient sheet metal, a narrow annular split tread strip having a pair of oppositely disposed T shaped slots at aligned points in the edges thereof to permit flexing of the split tread strip, and a strip contracting spring member secured to said strip, the top bars of the T's being adjacent and parallel, the leg bars of the T's extending to said edges, and the securing means for said member being located near said top bars in the continuous portion of the tread strip.

14. A relatively resilient sheet metal tire cover comprising a plurality of sections 121 and 123, two of which are joined to each other by a spring hinge, said hinge including opposed tongues 127' and 127'' on the ends of the sections and substantially integrally secured to each other.

15. A relatively resilient sheet metal tire cover comprising a plurality of sections 121 and 123, two of which are joined to each other by a spring hinge, said hinge including opposed tongues on the ends of the sections and substantially integrally secured to each other, one of the tongues being bent under the other, the section carrying the bent tongue being provided with portions bent over portions of the other section and serving to conceal the gap between the sections.

16. In a tire cover having slots between which are disposed spring-hinge-forming sections, beads encompassing and in alignment with said slots, and a finishing strip between said beads and having its margins disposed in said slots and retained by said beads.

17. A tire cover comprising a plurality of sections, two of which are joined by a spring hinge, the latter including a flexing strap member secured to the under surface of adjacent ends of the sections, one section end being provided with a raised lip lapping the other section end.

18. A tire cover comprising a plurality of sections, two of which are joined by a spring hinge, the latter including a flexing strap member secured to the under surface of adjacent ends of the sections, one section end being provided with a raised lip lapping the other section end, there being a slot between said lip and the section from which it is formed, said slot serving to receive and permit the passing therethrough of a finishing band on the outside of the cover.

19. In an annular tire cover of relatively resilient sheet metal, an annular face portion, and a combined tread, rear portion of channelled cross section partially secured thereto, the tread and rear portion being continuous and arcuate and greater than a semi-circle in length, a section of the edge of the tread and rear portion being integrally secured to a section of the edge of the face portion, the remaining sections of the edges being free so as to permit relative movement of the portions.

THOMAS J. McCORMICK.